Figure 1:
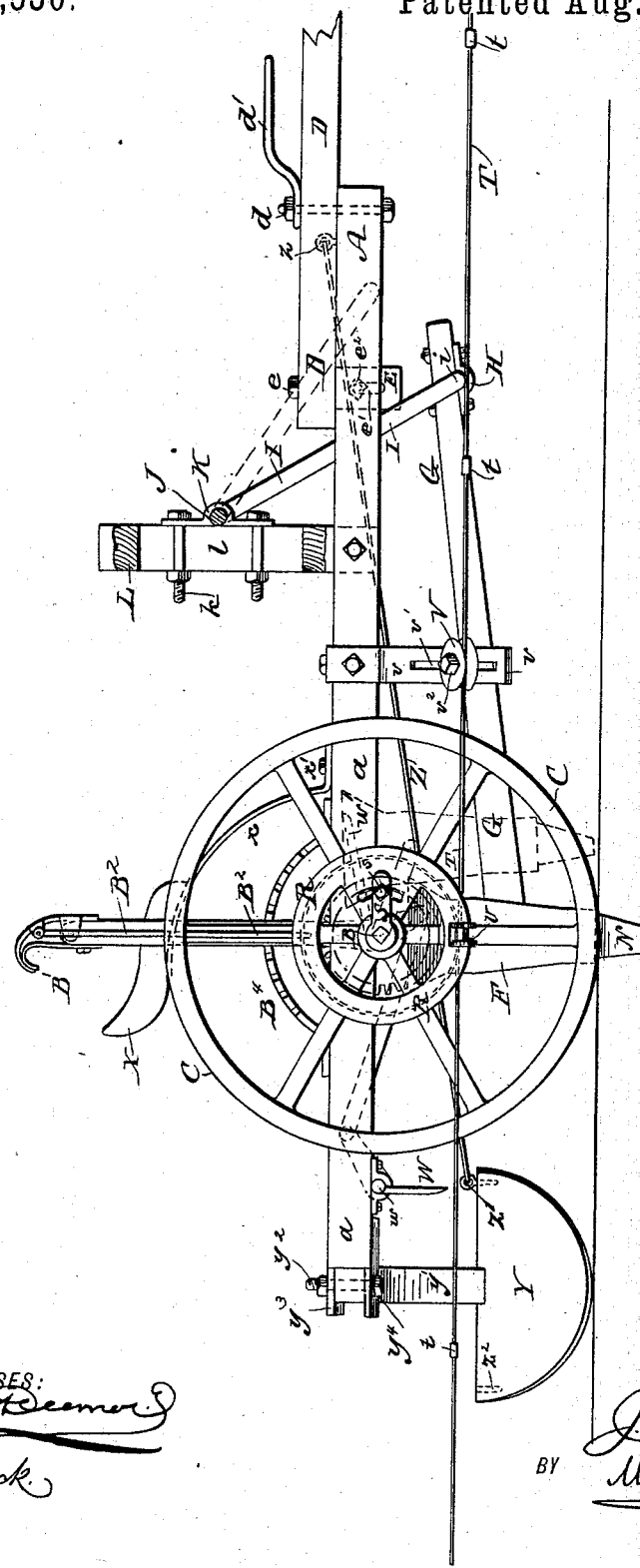

(No Model.) 4 Sheets—Sheet 1.

J. CLARK.
CHECK ROW PLANTER.

No. 388,530. Patented Aug. 28, 1888.

WITNESSES:
John H. Deemer
C. Sedgwick

INVENTOR,
J. Clark.
BY Munn & Co.
ATTORNEY.

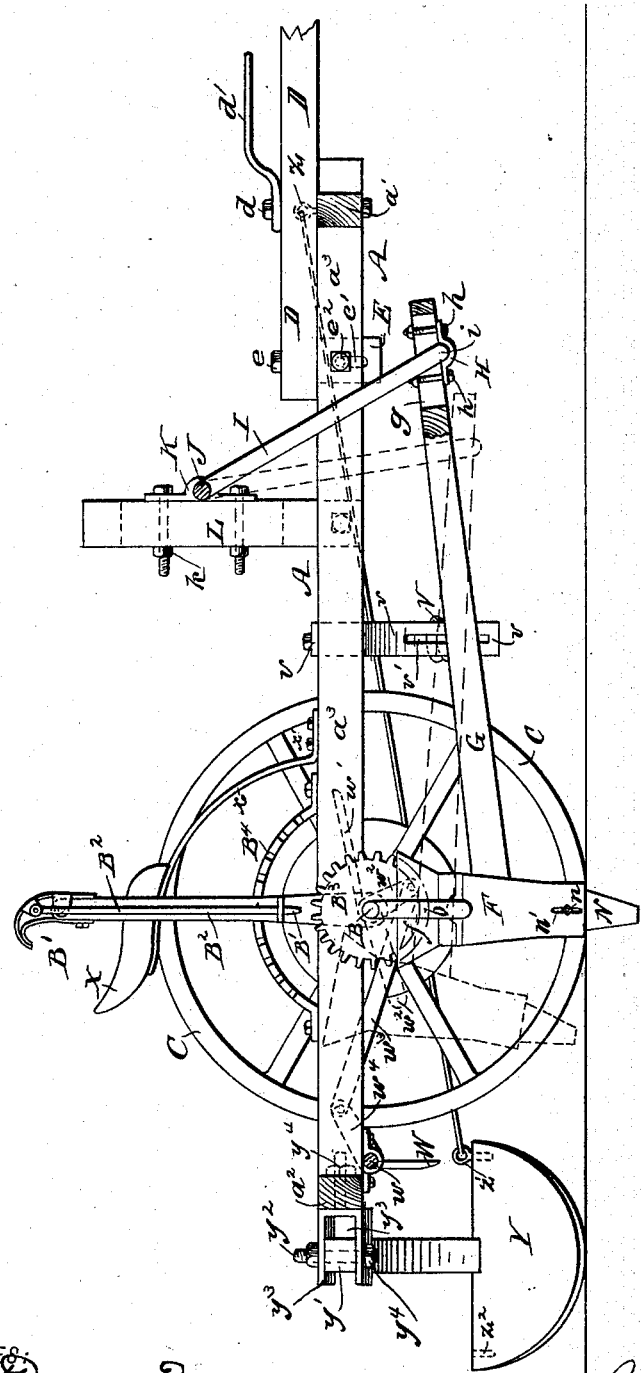

(No Model.) 4 Sheets—Sheet 3.
J. CLARK.
CHECK ROW PLANTER.
No. 388,530. Patented Aug. 28, 1888.
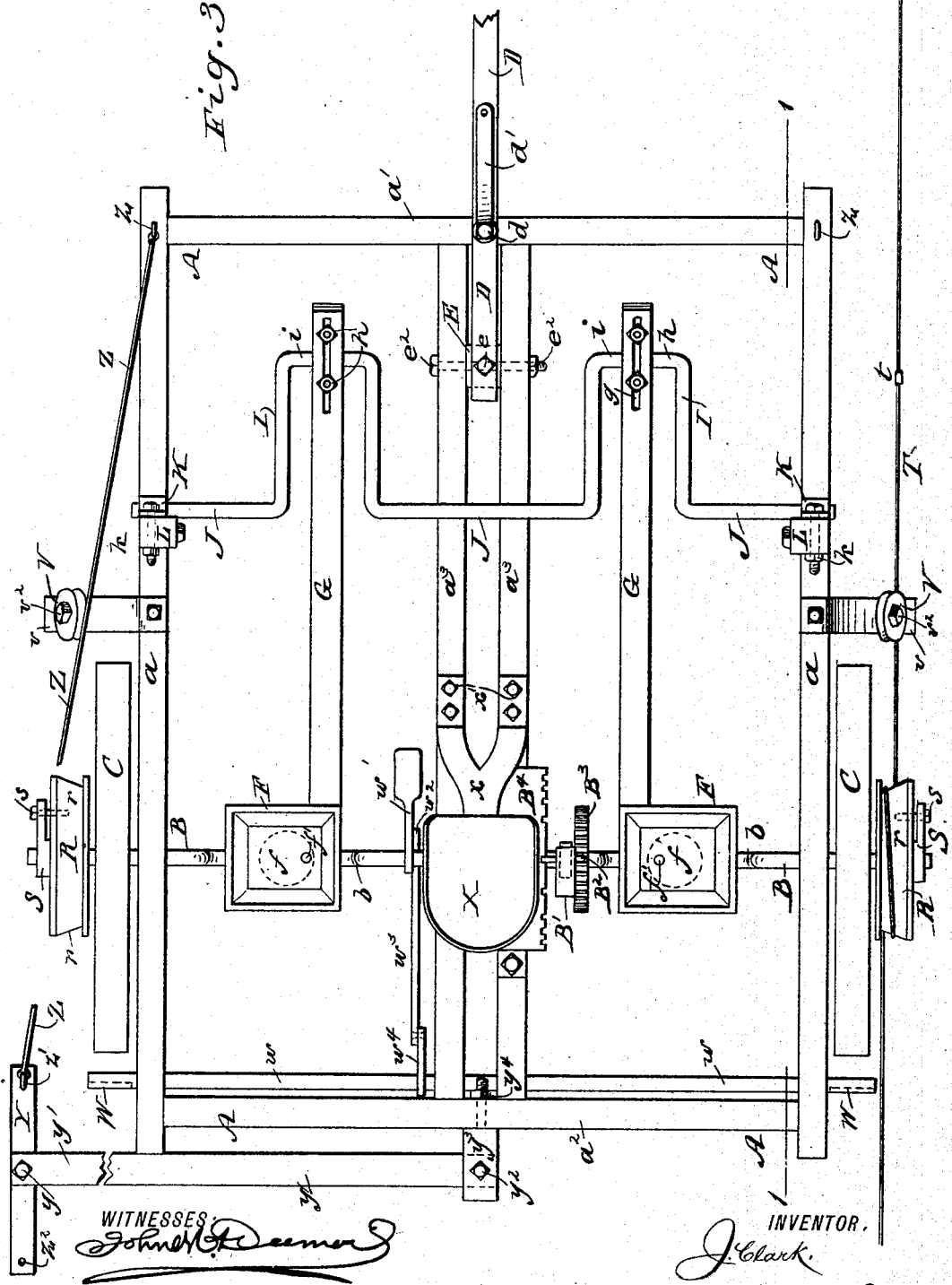
WITNESSES:
John W. Deemer
C. Sedgwick.
INVENTOR.
J. Clark.
BY Munn & Co.
ATTORNEY.
N. PETERS, Photo-Lithographer, Washington, D. C.

(No Model.) 4 Sheets—Sheet 4.
J. CLARK.
CHECK ROW PLANTER.
No. 388,530. Patented Aug. 28, 1888.
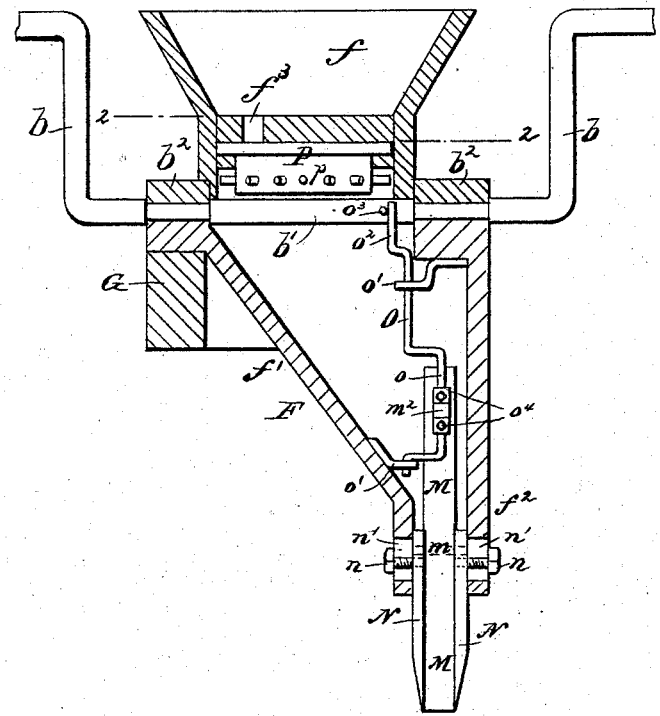
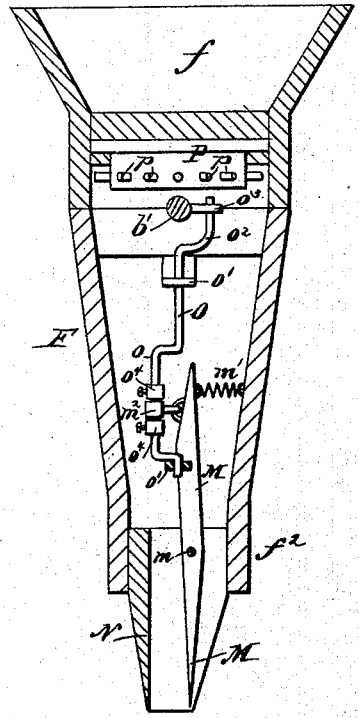
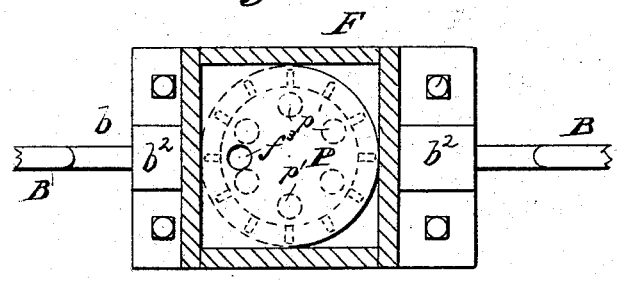
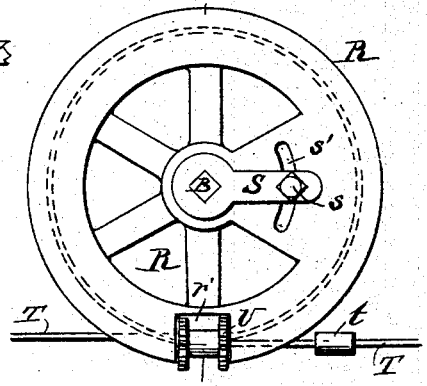
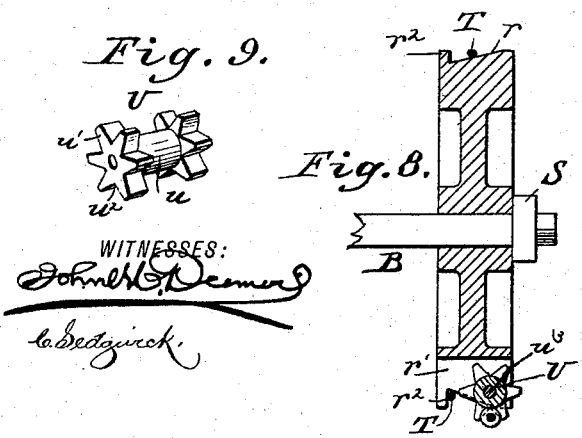
WITNESSES:
INVENTOR.
J. Clark.
BY Munn & Co.
ATTORNEY.

UNITED STATES PATENT OFFICE.

JOHN CLARK, OF SHEFFIELD, IOWA.

CHECK-ROW PLANTER.

SPECIFICATION forming part of Letters Patent No. 388,530, dated August 28, 1888.

Application filed May 5, 1888. Serial No. 272,941. (No model.)

*To all whom it may concern:*

Be it known that I, JOHN CLARK, of Sheffield, in the county of Franklin and State of Iowa, have invented a new and Improved Check-Row Planter, of which the following is a full, clear, and exact description.

My invention relates to a machine for planting hills of corn or other seed in accurate check-row; and the invention has for its object to provide a simple, comparatively inexpensive, and efficient machine of this class, allowing the planting to be done with unfailing regularity and with economy of time and labor and assuring a full stand and good crop.

The invention consists in certain novel features of construction and combinations of parts of the check-row planter, all as hereinafter described and claimed.

Reference is to be had to the accompanying drawings, forming a part of this specification, in which similar letters of reference indicate corresponding parts in all the figures.

Figure 1 is a side elevation of my improved seed-planter, partly broken away and in section. Fig. 2 is a longitudinal section of the machine, taken on the line 1 1 in Fig. 3. Fig. 3 is a plan view of the machine, partly broken away. Fig. 4 is a transverse vertical sectional elevation of one of the planting-prods of the machine, its superposed seed-box, and the crank of the shaft on which the prod is hung. Fig. 5 is a vertical sectional view of the prod, seed-box, and shaft taken at a right angle to Fig. 4. Fig. 6 is a plan view, in horizontal section, taken on the line 2 2 in Fig. 4. Fig. 7 is an outside face view of the button-wire guide-wheel and its wire clutch wheel and a part of the wire. Fig. 8 is a vertical transverse sectional view thereof taken on the line 3 3 in Fig. 7, and Fig. 9 is an enlarged perspective view of the check-row wire clutch-wheel.

The frame A of the seed-planter consists of opposite side bars, $a\ a$, front and rear bars, $a'\ a^2$, and a pair of parallel central longitudinal bars, $a^3\ a^3$, and is supported by the cranked shaft or axle B on wheels C C, which are loose on the axle, which is journaled in suitable boxes held to the bars $a\ a^3$ of the frame. The draft-pole or tongue D is bolted at $d$ to the front cross-bar $a'$, of the frame, and its rear end is held by a bolt, $e$, to the top cross-bar or plate of a ⊓-shaped iron, E, which at its opposite vertical side parts fits between the frame-bars $a^3\ a^3$, and is provided with slots $e'$, through which and the bars $a^3$ bolts $e^2$ are passed to hold the tongue in a manner allowing vertical adjustment of it to accommodate the team and at the same time keep the main frame level. The pole-bolt $d$ also holds to the frame a hammer-strap, $d'$, for connection of a doubletree, to which a team will be hitched at the pole.

Between the frame-bars $a\ a^3$ the axle B is bent to form two cranks, $b\ b$, extending in the same plane from one side of the axle and having like radius or throw at their wrists or cross-bars $b'$, onto which are hung, by suitable boxes or bearings, $b^2$, the prods F F, which have superposed boxes $f, f$, which carry the seed which is planted by the prods, as hereinafter explained. To each of the prods F is fixed the back end of a sway-bar, G, which at its forward end is provided with a box or bearing, H, in which the wrist $i$ of a crank, I, formed on a transverse shaft, J, is journaled. There are two of these cranks I in the shaft J, and both cranks extend in the same plane and have the same length or throw of oscillation at their wrists $i$, and one of the cranks is connected to each of the sway-bars, the bars being slotted at $g$, where the attaching-bolts $h$ of the bearings H pass through them to allow said bearings to be adjusted forward or backward on the sway-bars. The shaft J is journaled at opposite ends in boxes or bearings K K, which are held to uprights L L, fixed to opposite side-bars of the main frame, and these uprights are slotted at $l$, where the bearing-bolts $k$ pass through them, to allow the shaft J, with its cranks I I, to be raised or lowered as occasion requires, and as hereinafter explained.

I will next describe the planting prods F with more particular reference to Figs. 4, 5, and 6 of the drawings. Both prods are alike, except that they are made right and left handed, the inner side walls, $f'$, of both prods inclining downward and outward, and their prodding-jaws and their actuating mechanism are arranged next the outer vertical sides of the prods; hence a description of one prod and its mechanism will suffice for both prods and is as follows:

The prod-jaw M, which is opened to drop the seed, as presently described, is pivoted at $m$ to another jaw, N, which is held to the body $f^2$ of the prod at its lower end by bolts $n\ n$, which pass through vertical slots $n'\ n'$, in the body, thus allowing both jaws M N to be adjusted together and higher or lower to assure shallower or deeper planting of the seed. The lower ends of both prod-jaws are sharpened to enter the ground easily, and the relatively-movable jaw M is normally closed at its lower end to the other jaw, N, for holding the seed by a spring, $m'$, held to the jaw and the body of the prod.

At its upper part the jaw M is connected by a short pitman, $m^2$, with the wrist $o$ of a crank formed on a vertical shaft, O, which is journaled in bearings $o'\ o'$, held to the prod-body, and at its upper end the crank is provided with an arm, $o^2$, which projects into the path of a pin, $o^3$, fixed to the wrist $b'$ of the axle B, and whereby the jaw M will be opened to drop seed once for every revolution of the axle. To accommodate the vertical adjustment of the prod-jaws, the pitman $m^2$ is fitted loosely onto the shaft-wrist $o$, between adjustable collars $o^4\ o^4$, held to the wrist by set-screws, which allows the pitman to be adjusted vertically on the wrist accordingly as the prod-jaws are adjusted vertically for deeper or shallower planting.

At the upper part of the prod and just below the floor of the seed-box $f$ is journaled a horizontal seed-dropping wheel, P, which is provided with a series of apertures, $p'$, (shown in dotted lines in Fig. 6 of the drawings,) and through which the seed will drop into the body of the prod when each of these apertures comes into line with an aperture, $f^3$, in the floor of the hopper, any suitable provision being made to cause the seed to be dropped in regulated quantities for planting one hill at a time. The wheel P is provided with a series of peripheral radial pins, $p$, which are successively struck by the pin $o^3$ of the crank-wrist $b'$, and after said pin has operated the cranked shaft O for opening the prod-jaw M, and whereby after this jaw closes, the next hill of seed will be caused to fall into the prod, ready to be discharged the next time the jaw opens, and as hereinafter more fully explained. I am not limited to any particular arrangement of the wheel P having pins $p$, provided it takes the seed from the hopper and delivers it in regulated quantities to the interior of the prod, as the wheel is turned by the shaft-pin $o^3$, engaging the wheel-pins $p$.

The prod-carrying cranked axle or shaft B is rotated to vertically reciprocate the prods by means of either one of two wheels, R R, placed one at each end of the axle and outside of the main wheels C C of the machine. Each wheel R may at times be rotated on the axle, but is normally locked to the axle by means of an arm or lever, S, which is fast to the axle and extends radially therefrom at the face of the wheel, and is locked to the wheel by a screw or bolt, $s$, which passes through a curved slot, $s'$, in the wheel. When the bolt $s$ is tightened, the arm S, wheel R, and axle B rotate together; but when the bolt is loosened, the wheel R may be turned either way on the shaft to adjust the machine—and the wheel R particularly—with relation to the buttons $t$ on the check-row cord or wire T, stretched along the field to enter the prods into the earth a little sooner or later to maintain accurate check-row of the planted hills of seed. The periphery of the wheel R is beveled downward and inward, as clearly shown at $r$ in Figs. 3 and 8 of the drawings, and in an open transverse slot, $r'$, made at the periphery of the wheel, is journaled a clutch-wheel, U, which has a central or hub portion, $u$, smaller than its opposite end flange portions, which latter are formed as a series of teeth, $u'$, spaced by openings $u^2$ between them, as most clearly shown in Fig. 9 of the drawings. The shaft or axis $u^3$ of the button clutch-wheel U ranges at right angles to the shaft B, on which the wheel R is placed, and said shaft or axis is located near the outer side face of the wheel R, or so that the hub $u$ of the clutch-wheel stands a little above the inclined peripheral face $r$ of the wheel R, and the extremities of the wheel-teeth $u'$ will stand away from the peripheral flange $u^2$, formed at the inner part of the wheel R at the base of its inclined peripheral face $r$ a sufficient distance to clear the check-row wire T, lying next the flange $r^2$, to allow the wire free passage off of the wheel R during the operation of the machine. The clutch-wheel U will accommodate two of the wire-buttons $t$, or the outgoing button, which had last rotated the shaft and operated the prods, and the incoming button, which will give the next turn to the shaft to operate the prods, and as hereinafter more fully set forth. The distance between the buttons $t$ of the check-row wire T will be the same as the distance between the center line of the jaws of the two prods F F of the machine.

To guide the wire T onto the lateral center of the inclined peripheral face $r$ of the wheel R, I provide for each of said wheels at opposite sides of the machine a grooved guide-pulley, V, which is held to a plate or arm, $v$, bolted to the side bar of the machine-frame. These guide-wheel arms $v$ incline downward and outward from the main frame, and at their lower ends are provided with slots $v'$, through which the axial bolts $v^2$ of the pulleys V pass, thus allowing accurate adjustment of the pulleys for guiding the check-row wire onto the center or outer part of the inclined peripheral face $r$ of the wheel R next either pulley to operate in connection with the wheel U, to prevent crowding or binding of the outgoing button $t$ of the wire T by the incoming button of said wire.

The prod-carrying shaft may be turned by hand and then locked to hold the prods up clear of the ground while on the road or at other times when the machine is not planting by means of a hand-lever, B', which is fitted loosely on the shaft B, and has a spring-pressed catch-bar, B², which may be caused to engage any one of the peripheral teeth of a wheel, B³, which is fixed to the prod-carrying shaft B, and when the shaft is raised sufficiently the lever or a catch upon it will be entered into any one of a series of notches in a catch-plate, B⁴, which is fixed to the main frame A.

On the frame A, at its rear end, is journaled a transverse shaft, $w$, which carries a couple of scraper-plates, W W, which are opposite the rims or treads of the main wheels C C, and may be carried to the wheels to clear them of adhering earth by pressing on a foot lever or treadle, $w'$, which is hung on the wheel-axle B, and has an angular arm, $w^2$, which is connected by a link or bar, $w^3$, with an arm, $w^4$, fixed to the scraper-shaft $w$. This treadle-lever $w$, as also the hand-lever B', may be conveniently reached by the driver or operator on a seat, X, supported by a suitable spring-standard, $x$, fixed at $x'$ to the machine-frame.

The marker Y is held by a bolt, $y$, or otherwise to the outer end of a laterally-extending beam or arm, $y'$, which is held by a pivot-bolt, $y^2$, to a ⊃-shaped shackle or iron, $y^3$, which is held to the rear cross-bar of the frame A by a bolt, $y^4$, and the marker is stayed to the front end of the frame A by a rod, or it may be a chain, Z, which may be connected to either one of two eyes or staples, $z\ z$, on the opposite side bars of the frame. The connection of the rod or chain Z with the marker is made, preferably, by means of a pin, $z'$, which may be set into a hole, $z^2$, made at either end of the marker, according to which side of the machine it may be set, it being manifest that the marker may be swung around on its pivot-bolt $y$ to either side of the machine.

The operation is as follows: As the machine is drawn forward, the wheel R at one side, preferably the right-hand side, will be turned by the check-row wire T, which makes one complete turn around the wheel and reels onto and off from the wheel at its lower edge. The rotation of the wheel R by the wire-buttons $t$ rotates the axle or shaft B, and this causes the two prods F F to be raised and lowered, and, as the sway-bars G of the prods are connected to the cranks I of the shaft J, these cranks will be oscillated backward and forward, and the prods will also be swung or inclined bodily on the rotating crank-wrists $b'$, so that as the prod-jaws M N are about to enter the ground the prods will extend forward at their bottoms or jaws, as indicated by the dotted lines in Fig. 1 of the drawings, and as the prods leave the ground they will extend backward at their bottoms or jaws, as indicated in dotted lines in Fig. 2 of the drawings, and during the travel of the machine and while the prods are swinging between the extreme positions above stated the prod-jaws accommodate themselves to the forward movement in a manner preventing dragging of them in or through the earth and irrespective of the extent of projection of the jaws to secure deeper or shallower planting. When the prods stand vertically, at which time their jaws had entered the ground to the maximum depth for which they had been set, and thus keep out the dirt, the pins $o^3$ on the crank-wrists $b'$ strike the upper cranked arms, $o^2$, of the prod-shafts O and open the jaws M to drop one charge or hill of seed into the ground from each prod, whereupon, as the pins $o^3$ pass the arms $o^2$, the springs $m'$ will instantly close the jaws M, and under the continued rotation of the crank-wrists $b'$ said pins $o^3$ will then strike the pins $p$ of the wheels P and turn said wheels to cause another hill of seed to be discharged into each of the prods, ready to fall to the ground the next time the prod-jaws are opened by contact of the pin $o^3$ with the arm $o^2$, as above described. It is manifest that the charging and discharging of seed into and from each prod is accomplished automatically by the action of the one pin $o^3$ of the crank-wrist $b'$, on which the prod is hung.

As hereinbefore briefly stated, the cranked shaft or axle B is rotated by the buttons $t$ of the wire T engaging the clutch-wheel U on the wheel R at one side of the machine. As the wire laps onto the inclined periphery $r$ of the wheel R, at or a little outside of the lateral center of said periphery, and as the wire gradually slips down to the flange $r^2$ of the wheel R, it is obvious that during the rotation of said wheel the button lodges in the wheel U, and then, turning the wheel R to operate the prod-axle and prods, will, as it slips inward, turn the wheel U on its axis $u^3$ to give room at the hub or periphery of the wheel U for the next incoming button $t$ of the wire as the wire itself enters the notch between the next two pairs of the wheel-teeth, and as this next button lodges in the clutch-wheel against its hub and between its toothed end flanges, $u'\ u'$, the outgoing button leaves the wheel. This axial rotation of the clutch-wheel U in the wheel R thus assures the positive engagement of the successive buttons of the check-row wire for operating the wheel R and the prods to plant the hills of seed with unfailing regularity.

If in starting the machine the prods drop too soon, the screw or fastening $s$ of the shaft-arm S at the wheel R will be loosened and the wheel will be turned forward, and if the prods plant too late the wheel R will be turned backward and the fastening at $s$ will again be made secure. When planting more deeply in the ground, the boxings H at the forward ends of the sway-bars G will be moved forward and the boxings K on the uprights L will be lowered, and for shallower planting the boxings H will be shifted backward and the boxings K on the uprights L will be raised, in order to assure the clean effective tilting operations of the prod-jaws, and thus prevent them from dragging in the soil as the machine moves forward. When the end of the field is reached, the hand-lever B' will be operated to raise the prod-shaft and prods, and the marker Y will be raised while the machine is being turned around, and when this is done the marker will be lowered and adjusted at the other side of the machine into its previous track and the wire T will be readjusted and set onto the other wheel, R, and the machine will then be drawn back over the field to plant another two rows of hills of seed.

It is obvious that a machine constructed to operate as hereinbefore described may be made with but one prod hung to a crank-wrist and sway-bar and worked by the check-wire and wire-guide and button-clutch wheels to plant but one row of hills of seed, or the machine may be made with more than two prods to plant more than two rows of hills of seed at once; but the construction shown with two planting-prods is preferred in practice, as two rows of hills of seed may be planted by it without overtaxing the team, as the draft is very light and there is no weight on the horses' necks, and the machine may be operated successfully in well-prepared ground by one horse only.

Having thus described my invention, what I claim as new, and desire to secure by Letters Patent, is—

1. The combination, in a check-row planter, of a frame or sulky, a cranked axle or shaft journaled thereon, one or more planting-prods hung to said shaft, an oscillatory cranked shaft journaled on the frame, and a sway bar or bars connected to the prod or prods and hung on the crank-wrists of the oscillatory shaft, substantially as shown and described, whereby as the prod-shaft is rotated the prod or prods will be reciprocated vertically to enter and leave the ground, and will also be inclined toward the front and rear to avoid dragging in the soil, as set forth.

2. The combination, in a check-row planter, of a frame or sulky, a cranked axle or shaft journaled thereon, one or more planting-prods hung to the shaft, an oscillatory cranked shaft journaled in boxes vertically adjustable on the frame, and a sway bar or bars connected at one end to the prod or prods and hung at their other ends in boxes adjustable on the sway-bars toward and from the prod or prods and fitting the wrists of the oscillatory shaft-cranks, substantially as shown and described, whereby as the prod-shaft is rotated the prod or prods will be reciprocated vertically to enter and leave the ground, and the prods will also be inclined toward the front and rear to avoid dragging in the soil, and whereby also the sway-bars and prods may be adjusted to assure this action when the prods are set for planting at varying depths, as herein set forth.

3. In a check-row planter, the combination, with a frame, a cranked axle or shaft journaled thereon, and a wheel on said shaft operative by a check-row wire, of a prod or prods hung to wrists of the shaft-cranks, and said wrists provided with a pin, as $o^3$, a self-closing jaw at the extremity of the prod, and connections from said jaw operative by the pin $o^3$ for opening the jaw to drop the seed, substantially as herein set forth.

4. In a check-row planter, the combination, with a frame, a cranked axle or shaft journaled thereon, and a wheel on said shaft operative by a check-row wire for rotating the shaft, of a prod or prods hung on wrists of the shaft-cranks, which have pins $o^3$, and said prods provided with a self-closing jaw, M, of a shaft, O, journaled in the prod or prods and having a crank, $o$, a pitman connecting said crank to the jaw M, and said shaft O having an arm, $o^2$, operative by the pin $o^3$, to open the jaw to drop the seed, substantially as herein set forth.

5. In a check-row planter, the combination, with a frame and a cranked axle or shaft journaled thereon, of a prod or prods hung to said shaft, and said prods having jaws N M, one pivoted to the other and both vertically adjustable together to control the depth of the planting, of a shaft, O, in the prod, provided with a crank, $o$, and arm $o^2$, the latter operative by a pin on the crank-wrist to open the self-closing jaw of the prod, and said jaw connected to the crank $o$ by a pitman vertically adjustable on said crank to accommodate the bodily vertical adjustment of the prod-jaws, substantially as herein set forth.

6. In a check-row planter, the combination, with a frame, a cranked axle or shaft journaled thereon, and a wheel on said shaft operative by a check-row wire for rotating the shaft, of a prod or prods having seed-hoppers and journaled on wrists of the shaft-cranks, said wrists provided with a pin, $o^3$, a self-closing jaw at the extremity of the prod, a seed-delivering wheel journaled in the prod-hopper and adapted for intermittent rotation by the pin $o^3$ to drop seed into the prod, and connections from the self-closing jaw of the prod operative by the wrist-pin $o^3$ for opening the jaw to drop the seed, substantially as described, for the purpose set forth.

7. In a check-row planter, the combination, with a frame, a cranked axle or shaft journaled thereon, and a wheel on said shaft, of a prod or prods journaled on a wrist or wrists, $b'$, of the shaft, and said wrists provided with a pin, $o^3$, a seed-delivering wheel, P, on the prods, having peripheral pins $p$ and operative by the pin $o^3$ to drop the seed, a shaft, O, journaled in the prod and having a crank, $o$, and arm $o^2$, and a self-closing jaw, M, in the prod and connected to the shaft-crank $o$, substantially as shown and described, whereby the jaw M will be opened to deliver one hill of seed and will then close prior to dropping of the next hill of seed into the prod, and both the seed-dropping wheel and the prod-jaw will be operated from the same crank wrist-pin, as herein set forth.

8. In a check-row planter, the combination, with a frame, a cranked shaft journaled thereon, a planting prod or prods hung to the wrist or wrists of said shaft for reciprocation thereby to enter and leave the ground, and a wheel on the shaft operative by a check-row wire to turn the shaft and operate the prods, of an arm fixed to the prod-shaft and a fastening device adapted to hold the extremity of the arm at different positions at the face of the wire-wheel, substantially as described, for the purposes set forth.

9. In a check-row planter, the combination, with a frame or sulky, a cranked shaft journaled thereon and carrying reciprocating planting-prods, and a wheel loose on the shaft provided with a slot, $s'$, and receiving the check-row wire, of an arm, S, fixed to the shaft, and a fastening device, as $s$, holding said arm to the wire-wheel at its slot $s'$, substantially as herein set forth.

10. In a check-row planter, the combination, with a frame or sulky, a cranked shaft journaled thereon, a planting prod or prods hung to the shaft and vertically reciprocated thereby to enter and leave the ground, substantially as specified, of a wheel, R, held on the prod-shaft to rotate therewith, and provided with a laterally-inclined peripheral face, $r$, receiving the buttoned check-row wire, and a peripheral slot, $r'$, and a wire-button clutch-wheel, U, journaled in the slot $r'$, and provided with end flanges, $u'\,u'$, formed with radial teeth, admitting the check-row wire between them while the wire buttons lodge between said flanges, and a guide leading the wire to the center or higher portion of the inclined wheel-face $r$ of the wheel R, substantially as described, for the purposes set forth.

11. A check-row wire wheel for a seed-planter made with a laterally-inclined peripheral face and a slot opening at its periphery, and a check-wire-button clutch-wheel journaled in said slot and provided with end flanges formed with teeth admitting the check-row wire between them, while the buttons lodge between the end flanges, substantially as described, for the purposes set forth.

12. In a check-row planter, the combination, with a frame or sulky, a cranked shaft journaled thereon, a planting prod or prods hung to said shaft, and a wheel on the shaft provided with a laterally-inclined face receiving the check-wire, of a wheel, V, held adjustably to the frame and guiding the wire to the center or higher part of the inclined face of the wire-wheel, substantially as herein set forth.

13. In a check-row planter, the combination, with a frame or sulky, of a cranked shaft journaled thereon, a planting prod or prods hung to said shaft for vertical reciprocation thereby, and a wheel on the shaft receiving the check-row wire for operating the prods, and said prods provided with jaws vertically adjustable to regulate the depth of the planting, substantially as herein set forth.

14. In a check row planter, the combination, with a frame or sulky, of a cranked shaft journaled thereon, a planting prod or prods hung to said shaft for vertical reciprocation thereby, an oscillating cranked shaft journaled to the frame, sway-bars connecting the prods with the crank-wrists of the oscillating shaft, a wheel on the prod-shaft receiving the creck-row wire for operating the prods, and said prods provided with vertically-adjustable jaws to regulate the depth of the planting, substantially as described, for the purposes set forth.

15. In a check-row planter, the combination, with a frame, a cranked shaft journaled thereon, a planting prod or prods hung to said shaft for vertical reciprocation thereby, and a wheel on the prod-shaft receiving a check-row wire for operating the prods, of a wheel, $B^3$, fast on the prod-shaft, and a lever, $B'$, hung to said shaft and provided with a catch-bar, $B^2$, adapted to the wheel $B^3$, for raising the prods, substantially as herein set forth.

JOHN CLARK.

Witnesses:
B. W. UPDIKE,
A. R. RAVE.